UNITED STATES PATENT OFFICE

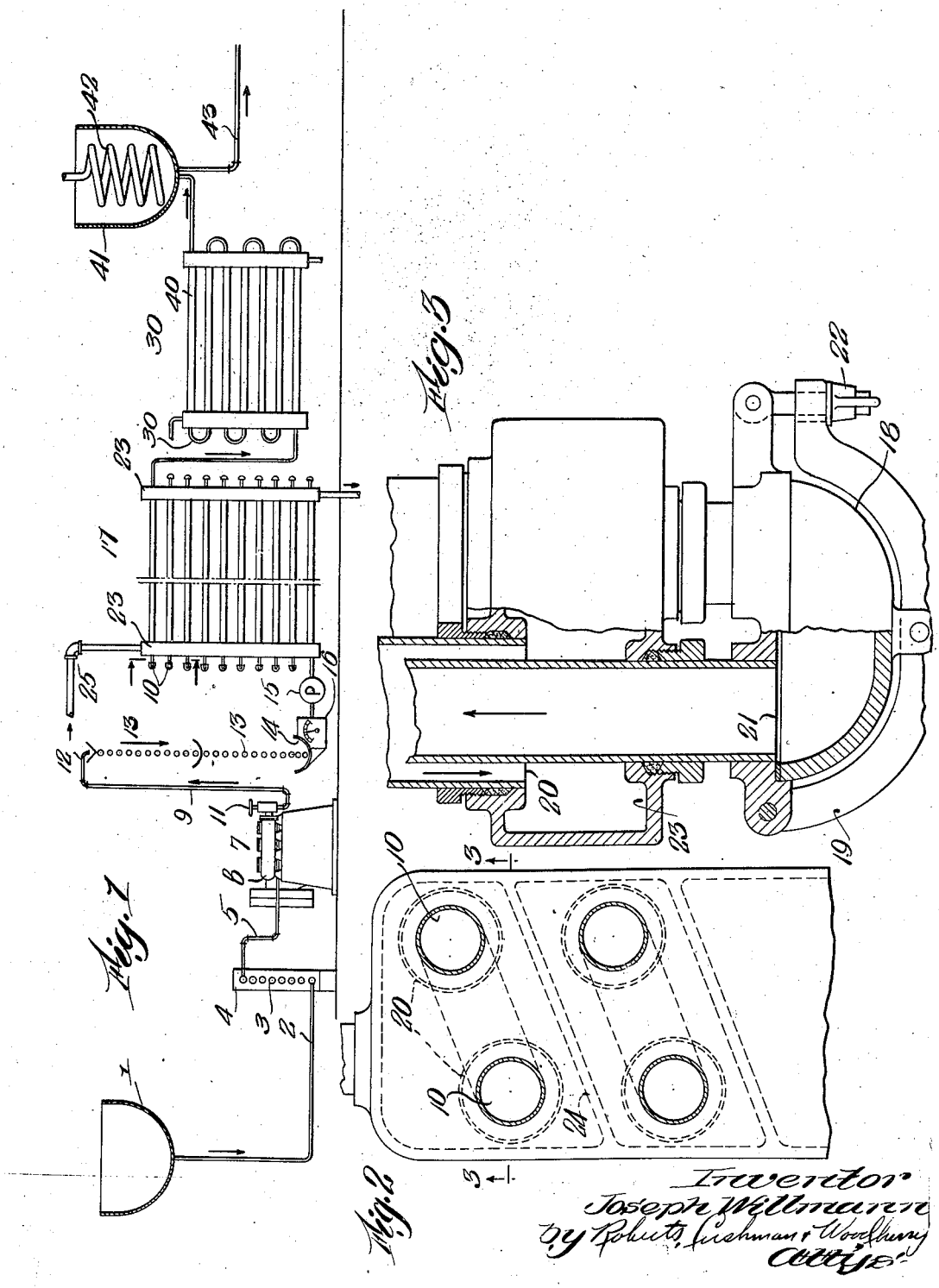
April 14, 1936.  J. WILLMANN  2,037,405
METHOD OF TEMPERING CREAM
Filed June 29, 1934  2 Sheets-Sheet 1

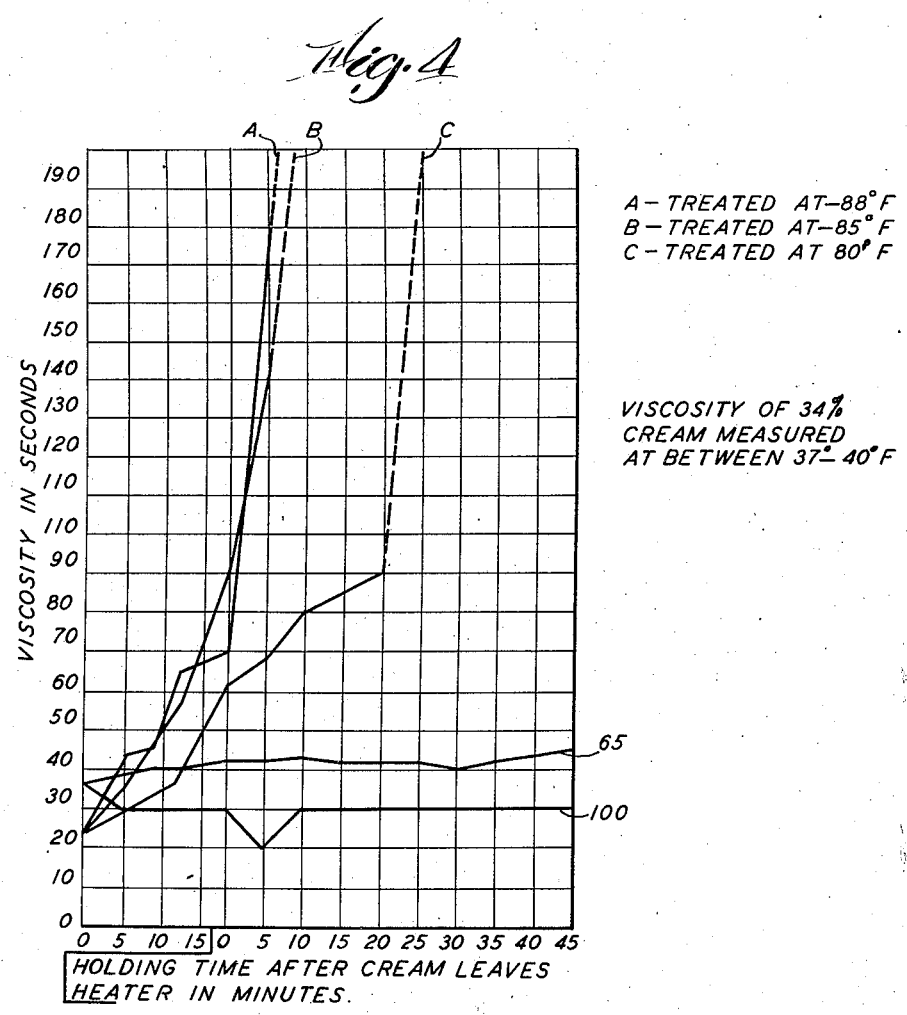

2,037,405

METHOD OF TEMPERING CREAM

Joseph Willmann, Derby, Conn.

Application June 29, 1934, Serial No. 733,023

1 Claim. (Cl. 99—60)

This invention relates to a method of treating or tempering cream and to the improved treated product resulting therefrom.

In the preparation of cream for human consumption, it is today necessary not only to collect and transport it for considerable distances, but also to subject it to various treatments, such as separation, pasteurization, bottling, etc., to mention only a few of the operations required.

Each of these treatments results in improving the ultimate product in one respect or another. But a detriment which is common to all of these treatments is that the mechanical agitation, incident to repeated handling, tends to cause some of the butter fat to collect and rise to the top surface of the cream. This separation and accumulation of butter fat forms a more or less continuous, yellow layer which is undesirable in appearance and which can not be readily redispersed into the remainder of the cream. It is referred to as "cream plug" in the dairy industry and is a condition which all creameries wish to eliminate,—especially in the heavier grades of cream which are to be distributed for home use.

In such creams, a test for the condition which is likely to lead to the formation of "cream plug" is to add some of the cream to hot black coffee. If the cream contains an appreciable amount of butter fat, in the form of free globules, and especially if these globules are relatively large and hence likely to coalesce and float to form a "cream plug", such globules will melt and float to the surface of the coffee where they appear as greasy or oily droplets which are yellow in color and very conspicuous. If present in appreciable amount they may also give the coffee a greasy taste or feel greasy to the lips when drinking the coffee to which the cream has been added.

This separation of the butter fat globules is associated in the minds of some consumers with creams which are old or about to "turn". This is because old cream tends to liberate the butter fat content readily when added to hot liquids. It is accordingly strenuously objected to, even though it may occur in a perfectly fresh, heavy cream, in which such separation is merely an indication that the cream has been mechanically or physically handled so as to cause some of the fat to solidify or separate from its emulsified condition, as by destroying the coating of the solids not fat, which surround and protect the fat globules.

It is an object of the present invention to provide a method of treating cream, and more especially the heavier creams or those containing a relatively high proportion of butter fat, so as to provide and retain the butter fat in the condition of a uniform dispersion. It is also an important object to secure this result in the treated cream and assure its continuance, whether the cream is subsequently to be subjected to mechanical agitation such as handling, etc., or to the test of adding it to hot liquids such as coffee, or to both conditions. It is a further object to accomplish this result without making any additions of foreign substances to the cream, and hence without changing its inherent composition in any respect. It is also an object to improve the desired appearance of the cream such as color, uniformity, and smoothness, as well as its free-flowing, heavy "body" or viscosity characteristics. It is a further object to provide convenient, inexpensive equipment in which to carry out the process. Other objects will appear from the following disclosure.

The method of the invention is generally applicable to cream but, in view of commercial conditions and practices, is usually carried out after the cream has been separated and pasteurized. Nevertheless, parts of the process can be applied at other stages and with the results desired.

It has now been found that if cream is subjected to certain mechanical treatments for the uniform dispersion of its butter fat component (more especially that part of the butter fat which is present in the form of free globules) the dispersed product as thus obtained has become more fluid. That is, it has a lighter "body" or lower viscosity than before treating, provided it is treated so as to eliminate curdling in hot coffee. While of course the composition of the cream has not been affected thereby, the general impression created upon inspection and use is that the cream is of lighter body and probably has a low butter fat content, which is not in fact the case. However, a real objection to such cream lies in the difficulty or impossibility of whipping it at ordinary temperatures and with the usual appliances if the product should have been treated at too high a pressure.

It is now found that if such dispersed cream, which has been emulsified or homogenized, is subjected to a certain heating treatment or tempering, as more fully hereinafter described, the body or viscosity of the treated cream may be restored and increased; and furthermore that the emulsion or dispersion thus obtained is rendered substantially permanent against subsequent mechanical agitation from handling, etc., and against subsequent separation when added to hot liquids such as hot coffee. It is also found that the cream which has been so treated may be readily whipped and will retain its stiff whipped condition.

In the case of cream which has lost its capacity to be whipped satisfactorily, owing to excessive pressure, as above indicated, this may be restored by the heat treatment or may be restored by the addition of some cream which has not been so violently dispersed, preferably before the heat treatment. The larger globules of butter fat in such cream, when present in small amount, do not seriously affect either the formation of cream plug or segregation in hot coffee, even if free but by the present process are protected in like manner to the smaller globules by the procedure herein described. In whipping the cooled cream they have a seeding effect upon the butter fat as a whole to give the whipped mass the required stiffness.

In such heat treatment it is found to be of the highest importance that no portion of the cream under treatment should be at any time subjected to excessive temperature and preferably to no temperature appreciably higher than the ultimate temperature which the whole mass of the cream is intended to attain in the treatment. Some improvement in the cream is effected by a heat treatment as low as 65° F. On the other hand it is found that heat treatments at 100° F., even for a very short period, are deleterious and result in a definite loss of viscosity of the treated product. With heat treatments at increasing intermediate temperatures improved results are obtained at increasing temperatures up to 90° F. or perhaps somewhat above. But at 95° F. the results become somewhat erratic and unreliable and at 100° F. the cream immediately suffers a decided decrease in viscosity.

It is now further found that, in the course of heating cream to a definite predetermined temperature as just described, the improvement of viscosity which is initiated at that temperature will continue and in fact will rise rapidly, even if the temperature is simply held at that point for a short period of time. Moreover, if such temperature of the cream is maintained for a considerable period of time the increase in viscosity will soon become so great that the cream will become undesirably "thick". For example, the cream may become so thick that it will not flow, even though a full bottle be completely inverted. Of course such a degree of thickness is not convenient nor desirable. Likewise, such prolonged period of treatment would be uneconomical. But it will be clear that by carefully regulating the rate, time and degree of the heating treatment, the heavier creams may be thus controlled in respect of their viscosity, even after it has been appreciably diminished, and that they will retain such viscosity throughout subsequent conditions of handling, storage and use.

A specific and preferred procedure will be described for effecting the treatment of the invention at a temperature of 85° F. and upon a cream having an initial viscosity of 24 seconds, with reference to the accompanying drawings, in which Fig. 1 is a diagrammatic showing or flow diagram of apparatus for the complete preparation and treatment of the cream by the present process;

Fig. 2 is an enlarged end view and cross-section of a part of the tempering unit, as indicated by the arrows 2—2 of Fig. 1;

Fig. 3 is a plan view, with parts broken away, of the end of one pair of the tubes of the tempering unit; and Fig. 4 is a graph on which are plotted the viscosities obtained at different temperatures of treatment with a cream having a butter fat content of 34% and an initial viscosity of 24 seconds and also with a cream having a butter fat content of 34% and an initial viscosity of 36 seconds.

The viscosity is measured, for example, (after chilling to a standard, handling temperature of 38 to 40° F. for 15 hours) in terms of the number of seconds required for the discharge of 10 c. c. of the cream from a standard glass pipette. The times of heating and holding the cream under treatment are plotted as abscissae and the resulting viscosities of the cream as ordinates. The maximum temperature of treatment is indicated in connection with each separate curve in degrees Fahrenheit and the temperatures attained by the cream at successive intervals by degrees, adjacent to respective portions of the curve.

It will be observed that in the longer periods of heat treatment the viscosity becomes so great that it is too thick to measure and is indicated by dotted lines. But upon treatment at 100° F. the viscosity falls and remains below that of the untreated cream.

In practical operation, the cream (which has already been separated from the milk) is mixed together in tank 1 to form a charge of the desired average viscosity, e. g. 24 seconds. It may or may not have been previously pasteurized. In either case it is desirable to subject it to a "flash" or rapid heat treatment, to a suitable temperature for effecting homogenization or emulsification, usually 140° F., as by passing through the pipe 2 to a coil 3, which is surrounded by a hot water jacket 4. The cream preferably passes upwardly through the flasher and thence through pipe 5 to a dispersing apparatus, such as a homogenizer or emulsifier. As here shown diagrammatically, a homogenizer 7 may be employed which is of the usual type and in which the cream is subjected to a certain pressure and then released, in the form of a spray or a thin film, into the pipe 9 so as to disperse the fat preferably without hurting the casein or whipping quality. From this it is passed through pipe 9, which is connected with the homogenizing unit, to a distributing pipe 12 from which it runs in a film over the cooling pipes 13 and is collected in troughs 14. It is then drawn off by pump 15, the output of which may be accurately controlled and definitely determined by the variable drive 16 (which may be of any well known construction) and delivered into the tempering device or unit 17.

The tempering unit includes a number (twenty being shown) of substantially horizontal tubes 10 connected at alternate ends to form a continuous ascending path by means of curved end pieces or chambers 18. The latter may conveniently be pivotally mounted, as at 19, to swing open and expose the ends of the connected pair of tubes for cleaning purposes, and to be closed and make a liquid-tight connection, with a gasket 21, and clamped in closed position by the thumb screw 22.

At each end of the bank of tubes 10, as thus arranged, is provided a header 23 through which the cream tubes pass and which are divided into compartments by the walls 24, corresponding to each pair of cream tubes 10 as shown in Fig. 2. These compartments open into and serve to connect the water jacket tubes 20 which surround the cream tubes 10, respectively, thereby forming a continuous circuit for the heating water.

The arrangement in the tempering unit 17 therefore provides a continuous path for the cream, through tubes 10 (and connections 18) from the bottom to the top of the unit, and a corresponding path for the heating water through the jackets 20 (and header 23) surrounding the cream tubes. The heating water enters the water jacket at the top as indicated at 25 or at other suitable point, as into any one or more of the headers 23 if desired, for which suitable provision such as inlet or outlet valves may be provided, although they are not shown because in a commercially operated apparatus they are usually unnecessary for a standardized set of conditions and procedure. Likewise, the water may be withdrawn from the water jacket at the bottom, as shown, or at any other intermediate point or points, not shown; and means may be provided, such as a thermometer, in the end of each pair of tubes 10 to determine the attained temperature of the cream and in the end of each pair of tubes 20 to determine the temperature of the heating medium.

In the present instance, for example, the heating water may be supplied at a temperature of 88° to 90° F. and caused to flow through the water jackets 20 at a uniform rate (determined by the temperature and rate of flow of the cream) and withdrawn at the bottom. It may be reheated and supplied to the system again for reuse, by passing through suitable equipment, such as a heater, a pump, etc., not shown.

The cream is delivered to the heating tubes 10, preferably at the bottom and at a definitely controlled rate of flow. As indicated, this may be regulated by a pump 15 of appropriate size and an adjustable variable drive 16 which is set at the required speed. In the instant case, for example, when the cream supplied from the coolers has a temperature of 38 to 40° F., the driving mechanism of the pump may be set at such a speed as to deliver the cream to the tubes 10 fast enough to fill the entire bank of tubes 10 with cream in eighteen or twenty minutes. At this rate of flow it is found that the cream may be heated almost to the temperature of the heating water in about eighteen to twenty minutes. At this rate of operation, therefore, the cream is constantly acquiring heat throughout its passage, but at a differential of temperature of only a few degrees Fahrenheit, or less than one degree Fahrenheit below that of the heating water in the adjacent water jacket, especially as it leaves the heater. This condition will depend upon the relative and absolute rates of the counter-current flow of the two liquids and the compensating heat-exchange effects therebetween. The treated or tempered cream never exceeds and preferably leaves the unit at a temperature only very slightly below that of the incoming stream of heating water.

The efflux of heat treated or tempered cream is next led through a blank of tubes 30, similar to the tempering unit but provided with a counter-current stream of cooling water in the jacket tubes 40, which may be introduced near the freezing point or 38 to 40° F., which chills the cream. On the other hand, if the cooling water is circulated slowly or is not so cold, the temperature of the cream may remain within the treating range of temperatures and this will have a holding or continued tempering effect upon the cream, as will be more fully described below.

The cream is then led to the cooling tank 41, provided with a coil 42, which may be rotated to keep the cream uniform and chilled to a temperature of 38 to 40° F., which is a convenient temperature for keeping and handling cream, and then run through a pipe line 43 to a bottling machine or the like, not shown.

It is a discovery of this invention, which will be readily understood from Fig. 4 of the drawings, that if the cream is held at the attained temperature for a period of time, instead of chilling at once, the viscosity continues to increase rapidly and, as indicated by the dotted lines and in the legend, may become too thick to pour. Such a holding period may be provided for by adding more tubes to the tempering unit, or pumping it more slowly, so that it will attain the required temperature when part way through the unit. It will then retain this temperature for the remaining period of its passage, which will therefore constitute a "holding period". The variable speed pump gives flexibility enough to regulate its viscosity between desired limits, and when set at a given speed is constant enough to establish a comparatively uniform set of conditions and to produce a reliable and substantially uniform product of the desired viscosity.

The treated or tempered cream as obtained by the above described procedure is characterized by retaining its butter fat in a completely emulsified, uniform condition, by uniform color and body or viscosity, and the continued retention of these properties even though the cream is subsequently subjected to severe handling. The treated cream may also be added to hot liquids, such as hot coffee, without separation of its butter fat content or feathering, and may be readily whipped in the usual manner in the household.

A further test, to demonstrate the uniformity, is to flow it in a thin film over glass, as on the inside of a cream jar or of a glass tumbler. In this test fresh normal cream of high quality will exhibit a decided non-uniformity, such as bubbles, small lumps, streaky distribution over the glass, and a tendency to draw away from the glass surface irregularly. The treated cream, on the other hand, flows freely and uniformly, wets the glass surface, shows no sign of bubbles or lumps, and upon being drawn off from the glass leaves a regular unbroken line of demarcation. The wetted surface when held to the light diffuses the light uniformly, and draws away to a very light thin film without breaking.

It is believed that the natural milk solids, not fat, of which casein is perhaps the most important, are present, even in very heavy cream of high butter fat content, in sufficient amount to preserve the dispersed and emulsified condition of the butter fat. But in creams which have been handled and processed, as above described, such effect has been destroyed. The procedure of the present invention, it is thought, restores and swells such solid matter so that it not only imparts viscosity to the cream as a whole but also becomes effective, individually to surround and thus preserve the separate and dispersed condition of the individual butter fat globules against subsequent abuse and against the effect of hot liquids.

From the foregoing it will be understood that the butter fat globules should be reduced in size, prior to the heat treatment, at least to the point where tendency to cream plug formation is overcome after the heat treatment. Conversely the globules should not be reduced beyond the point where the final product, even after being subsequently tempered, can be used to produce whipped cream.

It should be understood that the present disclosure is for the purpose of illustration only and that this invention includes all modifications and equivalents which fall within the scope of the appended claim.

I claim:

The method of treating cream which comprises breaking up the larger globules of butter fat into a limited range of sizes and thereafter tempering the cream, by gradually heating to a temperature between 65° and 95° to increase the viscosity, the lower limit of said range being high enough to permit the cream to be converted into whipped cream and the upper limit of said range being low enough substantially to avoid the formation of cream-plug after said tempering.

JOSEPH WILLMANN.